Oct. 2, 1934.  J. ROLAND  1,975,293
HYDRAULIC POWER TRANSMISSION
Filed Aug. 11, 1933  2 Sheets-Sheet 1
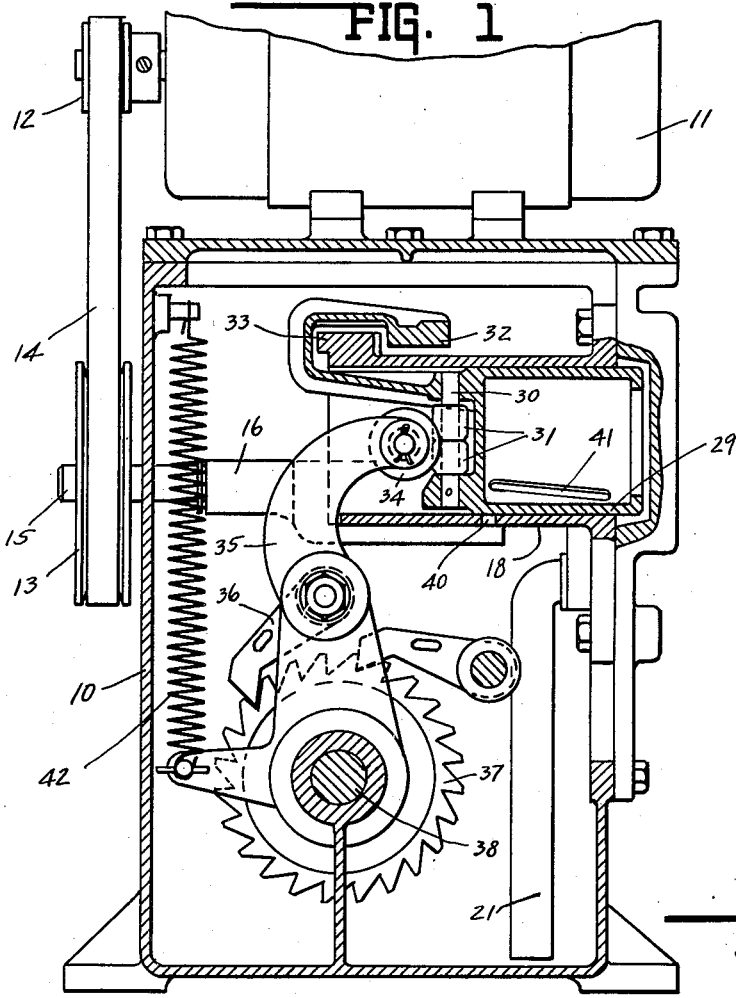
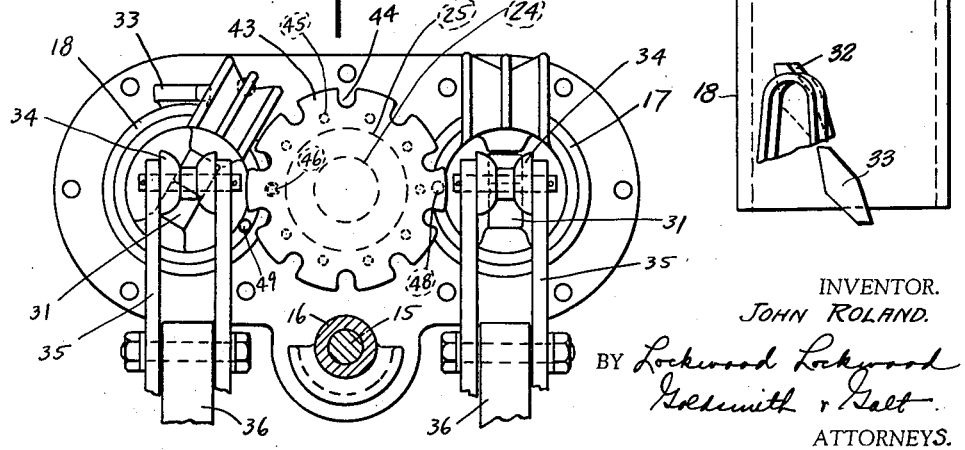
INVENTOR.
JOHN ROLAND.
BY Lockwood Lockwood Goldsmith & Galt
ATTORNEYS.

Oct. 2, 1934.   J. ROLAND   1,975,293
HYDRAULIC POWER TRANSMISSION
Filed Aug. 11, 1933   2 Sheets-Sheet 2
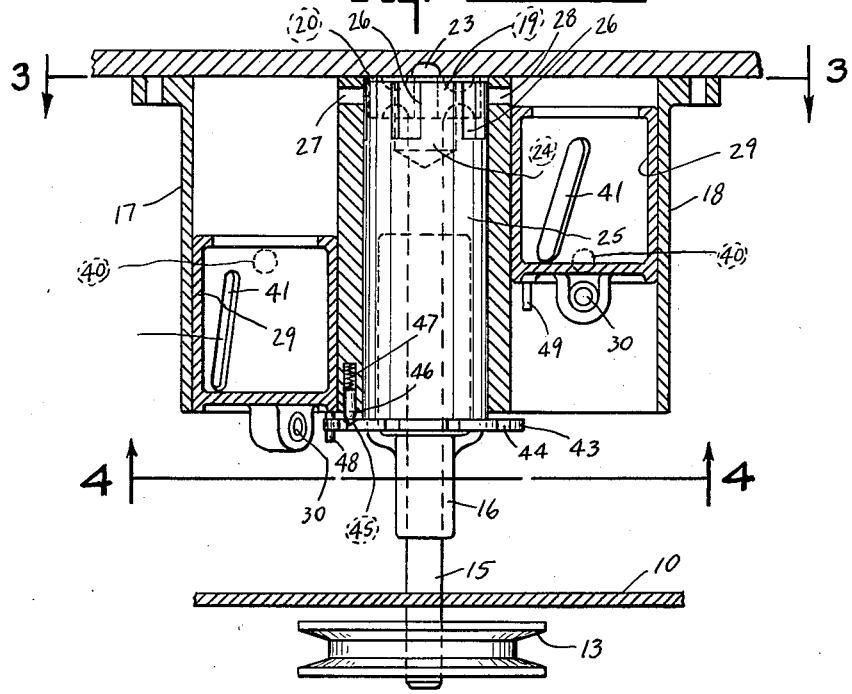
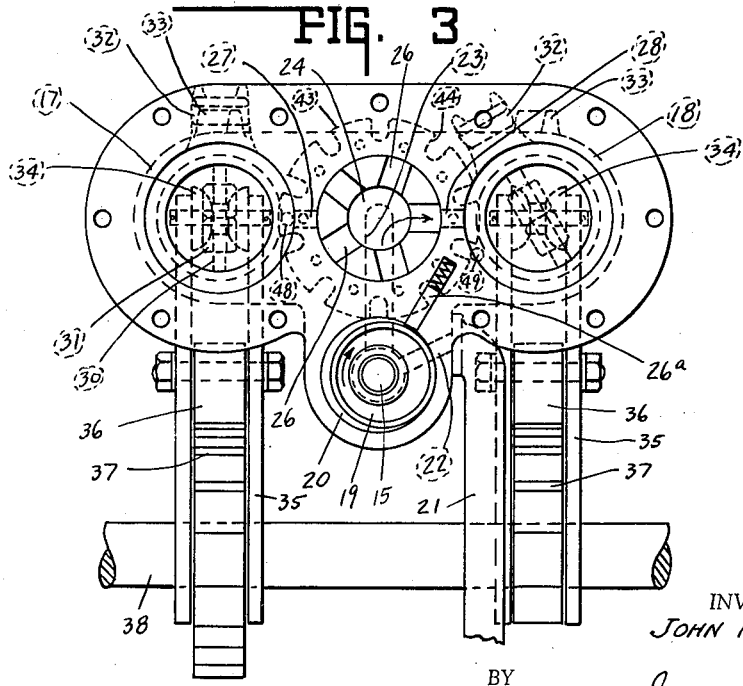
INVENTOR.
JOHN ROLAND.
BY
Lockwood Lockwood Goldsmith & Galt
ATTORNEYS.

Patented Oct. 2, 1934

1,975,293

UNITED STATES PATENT OFFICE 1,975,293

HYDRAULIC POWER TRANSMISSION

John Roland, Indianapolis, Ind., assignor to Schwitzer-Cummins Company, Indianapolis, Ind., a corporation Application August 11, 1933, Serial No. 684,671

5 Claims. (Cl. 121—122)

This invention relates to a hydraulic power transmission of the general character set forth and described in the co-pending application of Carl J. Winkler and Herman E. Winkler, Serial No. 648,229, filed December 21, 1932, entitled "Hydraulic power transmission and timing control".

The object of this invention is to provide a double-acting hydraulic power transmission embodying a plurality of cylinders and pistons to be alternately operated to drive the power driven shaft.

In the single acting transmission described in the above-mentioned application, the driven shaft is periodically rotated a partial revolution for each stroke of the piston through engagement of the pawl with the ratchet wheel keyed to the shaft. This single acting transmission is particularly adaptable for operating the fuel feeding screw of a domestic stoker. By means of the present invention, the driven shaft will receive two or more actions during each cycle of operation of the transmission, depending upon the number of cylinders and pistons employed. Thus, while the driven shaft will be given an intermittent movement, it will be substantially continuous, i. e., one movement immediately following the other without appreciable intervals. Thus, with a double acting power transmission embodying two cylinders and pistons, substantially twice the amount of fuel may be fed by the stoker as compared with the single acting transmission disclosed in the above-mentioned application. This is particularly applicable to stokers designed for commercial use as distinguished from domestic use. Whereas the single acting power transmission, disclosed in the above-mentioned application, is more adaptable for domestic use, the same principle and construction—including the same parts, but in dual form—may be utilized for the heavier feeding requirements of a commercial stoker, or a heavy duty domestic stoker.

The particular features of the invention involve the employment of a pair of cylinders and pistons which alternately act to drive the driven shaft, the power stroke of one piston rotating the shaft during the return or exhaust stroke of the other piston. A common oil pump is used for alternately pumping the oil to the two cylinders through the medium of a control valve which opens the oil passage from the pump to one cylinder, while closing the passage to the other cylinder. Said valve is rotated to alternately open and close the ports by the rotary movement of the pistons, as will be hereinafter more fully set forth and described.

The full nature of the invention will be understood from the accompanying drawings and the following description and claims:

In the drawings, Fig. 1 is a central vertical section through the drive taken centrally of one of the cylinders. Fig. 2 is a horizontal section taken through said cylinders with parts omitted. Fig. 3 is a section taken on the line 3—3 of Fig. 2. Fig. 4 is a section taken on the line 4—4 of Fig. 2, with parts omitted. Fig. 5 is a top plan view of one of the cylinders showing the camming element.

In the drawings there is illustrated a power transmission casing 10 upon which there is mounted an electric motor 11 driving a pulley 12 externally of the casing. The pulley 12 in turn drives a pulley 13 through a belt 14. The pulley 13 is mounted on a shaft 15 mounted in the bearings 16 formed in the casting of the cylinders 17 and 18. Mounted on the shaft 15 there is a pump head 19 operating in an annular chamber 20, said pump head being eccentrically mounted so as to draw a fluid, such as oil, from the bottom of the casing 10 through a pipe 21 and passageway 22 into said chamber, the oil being discharged therefrom by the rotation of the pump through the discharge passage 23 into the chamber 24 of a cylindrical valve 25. The usual spring-pressed abutment 26a is mounted to engage the pump head intermediate the intake and exhaust passages 22 and 23, respectively.

The cylindrical valve 25 is mounted between the cylinders 17 and 18, extending longitudinally thereof, and is provided with a plurality of slotted ports 26 adapted to register with the ports 27 and 28, respectively, of said cylinders. When one of the ports 26 registers with the port 27, the port 28 will be closed, and upon registry of the port 28, the port 27 will be closed. Thus, upon periodic rotation of the valve 25, the ports 27 and 28 will be alternately opened and closed.

Operating in each of the cylinders 17 and 18, there is a piston 29 closed at the top and open at the rear to receive the charge of fluid or oil pumped into its respective cylinder. The front face of each of said pistons carries a pin 30 upon which a pair of rollers 31 are mounted, there being a cam head 32 extending forwardly and rearwardly over the top of the cylinder in position to engage the cam member 33 formed on the top of the cylinder. Bearing against the rollers 31 there is a centrally-grooved roller 34 mounted on an arm 35 carrying a pawl 36 which is adapted to engage a ratchet wheel 37. For each piston there is a ratchet engaged by an operating arm and pawl for rotating a shaft 38 extending through the housing and mounted in suitable bearings therein. Thus, upon the power stroke of a piston, wherein it moves forwardly, the ratchet is rotated, causing a corresponding rotation of the shaft 38.

Each of the cylinders is provided with an exhaust port 40 with which an exhaust slot 41 in the piston is adapted to register during the exhaust stroke. By means of the cams 32 and 33 the piston in the cylinder 18 is rotated clockwise during the power stroke, maintaining the exhaust port 40 and slot 41 out of registry. Upon the cams passing each other, the pressure of the roller 34 against the rollers 31 will throw the piston counterclockwise, permitting the exhaust slot 41 to register with the exhaust port 40. Thereupon, by action of a spring 42, which is connected with the lever 35, the piston will be forced under spring tension rearwardly through its exhaust stroke, exhausting the oil in the cylinder. During this exhaust stroke, the cam 32 will move about the other side of the cam 33, rotating the piston counterclockwise to maintain the angular exhaust slot 41 in registry with the exhaust port 40 throughout the entire exhaust stroke.

Mounted on the forward end of the valve 25 there is a star wheel 43 having a plurality of radial notches 44 corresponding with each of the slots 26 and also with recesses 45 into which a ball or pin 46 is spring pressed by a spring 47. Said star wheel overlaps the forward ends of the cylinders in such position that the notches 44 therein may be engaged by the pins 48 and 49 extending forwardly from the front face of the pistons in the cylinders 17 and 18, respectively. As the piston is rotated about an angle of approximately 36 degrees by the engagement of the cams 32 and 33, said pins will engage in the notches of the star wheel and cause it to rotate in the clockwise direction. Such rotation is so timed as to cause the ball 46 to disengage one recess and engage the next for arresting further movement of the star wheel, and cause one of the slots 26 to engage with one of the ports 27 or 28. Said pins 48 and 49 are caused to move counterclockwise through an arc of approximately 36 degrees to effect the movement of the star wheel at the end of the power stroke of the piston. This intermittent rotation of the star wheel in the same direction, clockwise as herein shown, causes the port 28 to be opened when in one position, while the port 27 is closed, and the port 27 to be opened when in the next position, while the port 28 is closed. Thus, oil is alternately forced into first one cylinder and then the other.

In operation, the lower part of the casing 10 is filled with oil or any other desirable fluid. Upon starting the electric motor 11 oil will be pumped by the pump 19 into the chamber 24 of the valve 25. Any one of the ports 26 will be initially in registry with one of the ports 27 or 28, whereupon the oil will be forced under pressure into the corresponding cylinder. The piston will thereupon be forced outwardly through its power stroke, rotating in a clockwise direction (Fig. 4) during its movement and forcing the pawl 36 forwardly to mesh with the ratchet 37 and shaft 38. At the end of the power stroke, or after the cam 32 passes the cam 33, the tension exerted by the spring 42 will cause a counterclockwise movement of the piston by reason of the contact of the roller 34 with the rollers 31. This partial counterclockwise movement will cause one of the pins 48 and 49 to engage a recess 44 in the star wheel 43 and rotate it in a clockwise direction. The rotary movement of the piston brings the exhaust slot 41 into registry with the exhaust port 40, thereby relieving the fluid pressure upon the piston and permitting the spring 42 to return it through its exhaust stroke. During the return movement of the piston, the cam 32 will move about the other side of the cam 33, causing the piston to rotate further in a counterclockwise direction, keeping the slot 41 in registry with the exhaust port 40, and further rotate the star wheel to a point where it causes the intake port of the cylinder to be closed and the intake port of the other cylinder to be opened. Thereupon the fluid will be forced into the other cylinder and the cycle repeated.

By reason of the alternate movement of the pistons through their power strokes, the driven shaft 38 will be partially rotated by one piston, while the other piston is exhausted so that its rotation, while intermittent, is operated without appreciable intervals. This has the effect of doubling the capacity of a stoker operated by the shaft or any other similar device over that operated by a single piston.

The invention claimed is:

1. A hydraulic motor including a pair of cylinders, a reciprocating piston operable in each of said cylinders, intake and exhaust ports in said cylinders and pistons, a source of fluid under pressure common to said cylinders, a control valve through which fluid may pass from said source through intake ports in said cylinders, means for causing a partial rotation of each of said pistons at the end of the power stroke to open said exhaust ports, and means on said pistons for engaging said valve upon their partial rotation for causing the valve to alternately open and close the intake ports of said cylinders in timed relation.

2. In a hydraulic motor including a pair of cylinders, a reciprocating piston operable in each of said cylinders, intake and exhaust ports in said cylinders and pistons, a source of fluid under pressure common to said cylinders, a rotary control valve intermediate said cylinders through which fluid may pass from said source to said cylinders, said valve having ports adapted to register with the intake ports in said cylinders, means for causing a partial rotation of each of said pistons at the end of the power stroke to open said exhaust ports, and means on said piston for engaging said valve at the end of the power stroke and causing it to rotate therewith to alternately open and close the intake ports of said cylinders in timed relation.

3. In a hydraulic motor including a pair of cylinders, a reciprocating piston operable in each of said cylinders, intake and exhaust ports in said cylinders and pistons, a source of fluid under pressure common to said cylinders, a rotary control valve mounted intermediate said cylinders through which fluid may pass from said source to said cylinders, said valve having ports adapted to register with the intake ports in said cylinders, means for causing a partial rotation of each of said pistons at the end of the power stroke to open said exhaust ports, a star wheel operably connected with said valve, and projections upon said pistons for engaging and rotating said star wheel and valve therewith upon their partial rotation for closing the intake port to the cylinder containing the partially rotated piston and opening the intake port of the other cylinder.

4. In a hydraulic motor including a pair of cylinders provided with intake and exhaust ports, a reciprocating piston operable in each of said cylinders provided with an exhaust port adapted to register with the exhaust port of the cylinder upon a partial rotation of said piston, a source of fluid under pressure common to said cylinders, a control valve through which the fluid may pass to said intake ports, means for causing a partial rotation of each of said pistons at the end of the power stroke for causing the exhaust ports of said pistons and cylinders to register, and means on said pistons for engaging said valve upon the partial rotation thereof to actuate it to close the intake port of the cylinder wherein the piston and cylinder in said ports have been caused to register and open the intake port into the other cylinder.

5. In a hydraulic motor including a pair of cylinders spaced from each other having intake and exhaust ports therein, a rotary valve extending intermediate said cylinders adapted to alternately open and close said intake ports, a reciprocating piston operable in each of said cylinders provided with an exhaust port adapted to register with the exhaust port of its cylinder upon a partial rotation thereof, means for partially rotating said pistons at the end of the power stroke, a source of fluid under pressure common to said cylinders controlled by said rotary valve, and means on said pistons adapted to engage and partially rotate said valve in a continuous direction upon the partial rotation of the pistons for closing the intake port of the cylinder in which the partially rotated valve is mounted and opening the intake port of the other cylinder.

JOHN ROLAND.